ELECTRIC CARRIER CURRENT COMMUNICATION SYSTEMS

Filed Dec. 2, 1954 2 Sheets-Sheet 1

Inventors
K. G. HODGSON
D. L. THOMAS
By Philip M. Bolton
Attorney

Inventors
K. G. HODGSON
D. L. THOMAS
By Philip M. Bolton
Attorney

United States Patent Office 2,960,573

Patented Nov. 15, 1960

2,960,573

ELECTRIC CARRIER CURRENT COMMUNICATION SYSTEMS

Kenneth George Hodgson and David Lane Thomas, London, England, assignors to International Standard Electric Corporation, New York, N.Y.

Filed Dec. 2, 1954, Ser. No. 472,722

Claims priority, application Great Britain Dec. 14, 1953

3 Claims. (Cl. 179—15)

The present invention relates to electric carrier current communication systems.

In multichannel systems it is common practice to assemble a number of communication channel frequency bands of equal width, side-by-side, to form a substantially continuous frequency band which is transmitted over a cable or other communication path. Each channel band is shifted to its final position in the main frequency band by one or more amplitude modulation processes, and filters with relatively sharp cut-off characteristics have generally to be used to select one of the modulation sidebands corresponding to each channel, to the exclusion of the carrier wave and the other unwanted sideband. The filtering arrangements for such a system are accordingly liable to be expensive.

In such multichannel systems, the virtual carrier frequencies corresponding to the respective channel sidebands, when assembled in their final positions in the main frequency band, are usually spaced apart by a constant frequency, which is commonly 4 kilocycles per second. These virtual carrier frequencies are not transmitted, and are generally different from any of the carrier frequencies actually used in the modulation processes. They are the carrier frequencies which would have been used if the channel bands were translated to their final positions by a single modulation process.

In these conventional multichannel systems, substantially the whole of the available frequency band is occupied by the communication channels, and there is no additional space available for auxiliary supervisory and other signals, and these signals therefore have to be transmitted within the band occupied by each channel. This causes the auxiliary signal receivers to be complicated and expensive, because it is necessary to provide guard circuits in order to prevent false operation by the communication signals.

A number of the above-mentioned objections are avoided if the available main frequency band is wide enough to allow the individual communication signal bands to be spaced apart, so that thereby unoccupied bands can be provided for the transmission of auxiliary signals.

The object of the present invention is to provide simple arrangements for producing the communication signal bands, and for transmitting auxiliary signals in the vacant spaces between the communication bands, in a system of the last-described type. The invention makes use of the properties of what have been called "single sideband modulators," which are modulating circuits so arranged that one of the usual pair of sidebands is cancelled out, but not the other, thus providing a single sideband output without the use of filters. The term "single sideband modulating circuit" will be used in this specification to mean a circuit arranged in this way. Such modulating circuits are described in British patent specification No. 260,067 and United States patent specification No. 2,248,250.

While the present invention is primarily concerned with the transmission of auxiliary signals, it can also be applied to simplify the production of the individual channel bands in a system in which the whole available frequency band is substantially filled up with communication channel bands, as will be explained more fully later on.

The invention provides a single sideband modulating circuit for an electric carrier current communication system comprising first and second input circuits and a single output circuit connected to amplitude modulating means, and a source of carrier waves arranged to supply a carrier wave of given frequency to the said modulating means, the circuit being so disposed and arranged that when a signal wave is applied to the first input circuit substantially only a lower sideband of the said carrier wave is delivered to the output circuit without an upper sideband, and that when a different signal wave is applied to the second input circuit substantially only an upper sideband of the said carrier wave is delivered to the output circuit without a lower sideband.

The invention also provides an electric carrier current communication system employing this type of sideband modulating circuit.

The invention further provides a transmitting terminal for a multichannel electric carrier current communication system comprising a plurality of single sideband modulating circuits each of which is adapted to produce a pair of sidebands in response respectively to first and second input signal waves corresponding respectively to one pair of channels, the said sidebands being respectively lower and upper sidebands of the same carrier wave, the frequencies chosen for the carrier waves of the respective modulating circuits being spaced apart sufficiently to prevent overlapping of the sidebands corresponding to different pairs of channels, and each modulating circuit being connected to a communication path through a bandpass filter designed to pass substantially only the two sidebands produced by the corresponding modulating circuit.

The invention will be described with reference to the accompanying drawings, in which.

Figure 1:
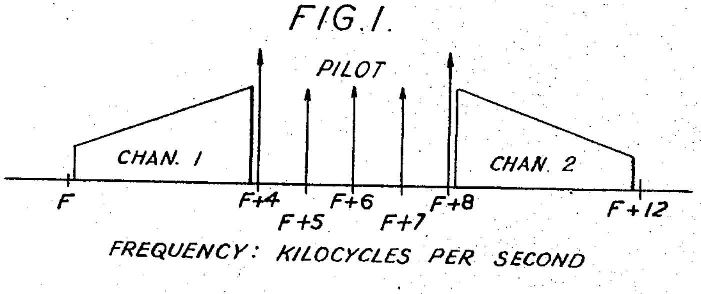
Fig. 1 shows a frequency allocation diagram for a multichannel carrier system to which the invention may be applied.

Fig. 1 shows a frequency allocation diagram of a simple example of the application of the present invention. A frequency band of width 12 kilocycles per second extending from F to F+12 kilocycles per second is allocated to two channels, each occupying a band substantially 4 kilocycles per second wide. Channel 1 is obtained as the lower sideband of a carrier wave of frequency F+4 kilocycles per second, and channel 2 as the upper sideband of a carrier wave of frequency F+8 kilocycles per second. An empty space 4 kilocycles per second wide is thus available for the transmission of other signals.

It would, for example, be possible to transmit in this space a pilot wave of frequency F+6 kilocycles per second to be used for automatic gain control according to known methods. Instead, or in addition, other waves or narrow bands conveying supervisory signals for the two channels could be transmitted in this space. Alternatively, one or more carrier telegraph channels could be transmitted in the vacant space, and this facility is very convenient in systems where the normal communication channels are subjected to amplitude compression and expansion processes for noise reduction, because if the telegraph signals have to be transmitted over a channel normally used for communication signals, the compression and expansion produces distortion effects in the telegraph channels which cannot easily be avoided. By transmitting the telegraph channels in the empty frequency space, the compression and expansion apparatus is avoided.

Figure 2:
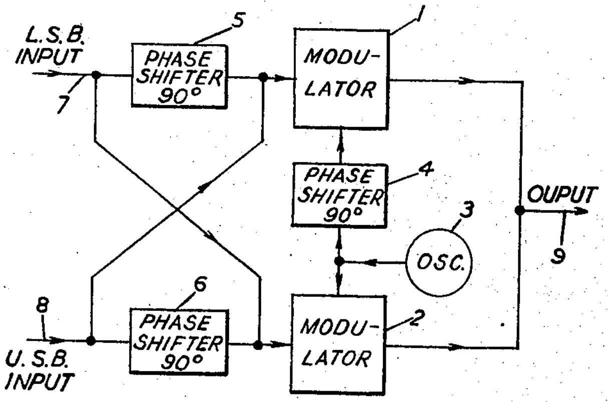
Fig. 2 shows a single sideband modulating circuit according to the invention.

Fig. 2 shows a block schematic circuit diagram of a single sideband modulation circuit according to the invention. It can be regarded as a development of the single sideband modulating circuit disclosed in Fig. 1 of British patent specification No. 260,067.

Fig. 2 comprises two similar amplitude modulators 1, 2, preferably balanced modulators of any suitable known type, an oscillator 3 serving as the carrier wave source, and three phase shifters 4, 5, 6, each of which should be designed to introduce a phase shift of substantially 90° at all frequencies in the band of frequencies which will be applied to it. The two phase shifters 5 and 6 should introduce phase shifts of the same sign, and it will be assumed that the phase shifter 4 also introduces a phase shift of the same sign as the others, but this is not essential.

Connections are supplied from the oscillator 3 directly to the modulator 2, and through the phase shifter 4 to the modulator 1. An input conductor 7 for a first channel frequency or band is connected through the phase shifter 5 to the modulator 1 and directly to the modulator 2. A separate input conductor 8 for a second channel frequency or band is connected directly to the modulator 1, and through the phase shifter 6 to the modulator 2. The output waves from the two modulators are combined in a common output conductor 9, which may be connected to a cable circuit or other communication paths.

Although it was stated above for simplicity that the phase shifters 4, 5 and 6 produce phase shifts of 90°, it will be understood that the basic requirement is that the phase-shift difference between waves at any frequency supplied to the modulators 1 and 2 from 3, 7 or 8 should be 90°, and the phase-shift difference of the two paths from input conductor 7 to the two modulators should be opposite in sign to that of the two paths from input conductor 8. If any appreciable phase shift is introduced in any of the direct connections, the corresponding phase-shifter should be designed accordingly so that the required phase-shift difference is obtained. It may even be more convenient to produce the desired phase-shift difference by means of two appropriately designed networks inserted respectively in both connections from 3, 7 or 8 to the two modulators, as is done in the arrangement disclosed in specification No. 260,067 already referred to.

The arrangement of Fig. 2 differs from that disclosed in specification No. 260,067 by the provision of an additional phase shifter to enable the modulator circuit to deal simultaneously with two separate input modulating signals or waves. This is possible because only a single modulation sideband is produced in response to each input signal. If the input conductor 8 and the phase shifter 6 were omitted, the circuit would be substantially the same as that disclosed in specification No. 260,067, and the outputs of the modulators 1 and 2 can be so combined in conductor 9 that when a modulating wave or signal is applied over conductor 7, the upper sidebands cancel out, and so only the lower sideband is produced on the output conductor 9. According to the invention, a second modulating wave or signal may be simultaneously applied over conductor 8, and it will then be found that now the lower sidebands cancel out and only the upper sideband is produced on conductor 9 in response to this wave. The modulating circuit accordingly provides two sidebands, in different frequency ranges, corresponding respectively to the two modulating waves or signals. Conductor 7 may then be called the "lower sideband input conductor" and conductor 8 the "upper sideband input conductor." It will be understood that in order that substantially complete cancellation of the unwanted sidebands shall be obtained in each case, it is necessary that the levels of the upper and lower sidebands produced respectively by the modulators 1 and 2 shall be equal.

Thus, referring to Fig. 1, the oscillator 3 of Fig. 2 may be designed to supply a carrier wave of frequency F+4, and a speech frequency band extending, say, from 100 to 3,500 cycles per second may be applied over conductor 7. Only the lower sideband designated Chan. 1 and located between F and F+4 will be produced on the output conductor 9. At the same time, a wave having a single frequency of 2,000 cycles per second, for example, may be applied over conductor 8. This will produce an upper sideband frequency of F+6 which lies in the vacant space, and can be used if desired for the pilot wave for automatic gain control, as already mentioned.

A second modulating circuit (not shown), similar to Fig. 2, may be provided, in which the oscillator 3 is designed to generate a carrier wave of frequency F+8. A second speech frequency band corresponding to another channel may then be applied over the input conductor 8, and will appear on the output conductor 9 as the upper sideband, designated Chan. 2 in Fig. 1, lying between the frequencies F+8 and F+12. A supervisory tone having a frequency of 1,000 cycles per second, for example, may be applied over conductor 7. This will appear as a lower sideband frequency F+7 in the vacant space.

Various other selections are evidently possible. For example, the pilot tone F+6 may be omitted, or transmitted direct (that is, without modulating a carrier), and a supervisory signal for channel 1 may be transmitted by supplying a tone frequency of 1,000 cycles per second to conductor 8 of the modulating circuit shown in Fig. 2. This will appear as an upper sideband frequency of F+5 lying in the vacant space.

It will be evident that several separate tones of different frequencies may, if desired, be simultaneously transmitted in the vacant space by supplying corresponding tones having frequencies within the speech band over conductor 8 of Fig. 2, and these tones may be used for a variety of purposes. In particular, one or more carrier telegraph channels may be provided, occupying a series of narrow bands all located in the vacant space, by applying the telegraph modulated voice frequency carriers over conductor 8. As mentioned above, this permits compression and expansion to be applied to the speech channel band applied over conductor 7, without affecting the telegraph channels.

Figure 3:
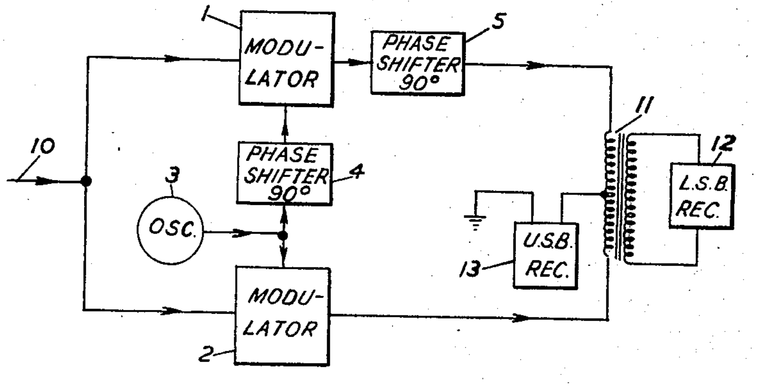
Fig. 3 shows a single sideband demodulating circuit.

Fig. 3 shows a single sideband demodulating circuit designed to recover separately the signal waves occupying the lower and upper sidebands produced by the circuit of Fig. 2. It comprises elements 1 to 6 similar to the correspondingly numbered elements of Fig. 2, but no phase shifter corresponding to 6 is required. The input conductor 10 from the cable circuit or other communication path is connected directly to the inputs of the modulators 1 and 2, and the phase shifter 5 is connected to the output of the modulator 1. The outputs of elements 5 and 2 are connected to opposite ends of the centre-tapped primary winding of a hybrid coil 11, the secondary winding of which is connected to a receiver 12 for the signals occupying the lower sideband generated by Fig. 2, that is, for the speech channel 1. The centre tap of the primary winding of the hybrid coil 11 is connected to ground through a receiver 13 for the signal occupying the upper sideband (e.g. the tone signals).

The oscillator 3 will be set to provide the same carrier frequency as in Fig. 2, namely F+4 kilocycles per second.

With this arrangement it will be found that the waves produced by the interaction in the modulators 1 and 2 of the lower sideband with the carrier wave are in opposite phase at the terminals of the primary winding of the transformer 11, and accordingly these waves are supplied to the lower sideband receiver 12, but so long as they are of the same amplitude, do not reach the upper sideband receiver 13 because the centre tap of the primary winding of the hybrid coil 11 will be at zero potential. On the other hand, the waves produced by the interaction of the upper sideband with the carrier wave in the modulators will be in the same phase at the terminals of the primary winding of the hybrid coil 11 and accordingly, if they are of equal amplitude, they do not affect the lower sideband receiver 12, but are supplied instead to the upper sideband receiver 13. Thus the circuit of Fig. 3 provides a very simple arrangement for demodulating the received sidebands and at the same time separating the speech waves from the tone signals. It will be evident that Fig. 3 will operate in the same way whatever the nature of the signals conveyed by the two received sidebands.

Figure 4:
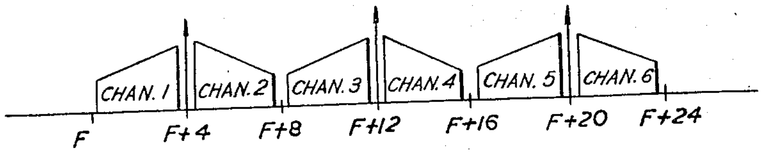
Fig. 4 shows a frequency allocation diagram for another type of multichannel carrier system to which the invention may be applied.

The vacant space between frequencies F+4 and F+8 in Fig. 1 may be occupied by a further speech channel (not shown). All that is necessary is to supply the speech frequency band for the extra channel over conductor 8 of Fig. 2, in which case it appears in the vacant space as an upper sideband of the carrier frequency F+4, the channel 1 sideband appearing, as before, as a lower sideband in the position shown in Fig. 1. By this means an even number of speech channels ($2n$) could easily be provided to occupy and substantially fill a wide frequency band by providing $n$ modulating circuits similar to Fig. 2, the carrier frequencies supplied by the respective oscillators 3 being spaced apart by 8 kilocycles per second. Each modulating circuit then provides sidebands corresponding to a pair of channels, one being a lower sideband and the other an upper sideband. The basic frequency bands corresponding to the two channels will be applied respectively over conductors 7 and 8. This type of allocation is illustrated in Fig. 4, for three pairs of channels. It can evidently be extended to any even number of channels.

Figure 5:
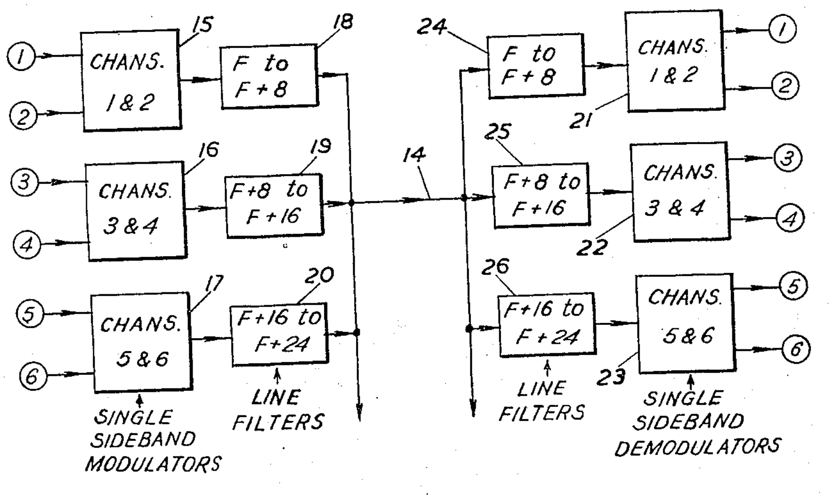
Fig. 5 shows a block schematic circuit diagram of a multichannel carrier system according to the invention, in which the frequency allocation of Fig. 4 is employed.

Fig. 5 shows a block schematic circuit diagram of a multichannel carrier system having the channels allocated as shown in Fig. 4. At the sending end of a cable circuit or other communication path 14 are three single sideband modulating circuits 15, 16, 17 each of which is similar to Fig. 2, and which provide the sidebands for channels 1 and 2, 3 and 4, 5 and 6, respectively. These modulating circuits are connected to the circuit 14 through individual separating bandpass filters 18, 19 and 20, according to conventional practice. The carrier wave oscillators 3 (Fig. 2) in the modulating circuits 15, 16 and 17 are set respectively to generate frequencies of F+4, F+12 and F+20 kilocycles per second, according to Fig. 4. The filters 18, 19 and 20 are designed to pass the upper and lower sidebands corresponding respectively to these carrier frequencies, and their passbands will accordingly respectively extend substantially from F to F+8, F+8 to F+16, and F+16 to F+24 kilocycles per second.

At the receiving end of the circuit 14 are three single sideband demodulating circuits 21, 22, 23 each of which is similar to Fig. 3, and arranged to recover the original signal bands of channels 1 and 2, 3 and 4, 5 and 6 respectively. These three demodulating circuits are connected to the circuit 14 through separating filters 24, 25 and 26 similar respectively to filters 18, 19 and 20.

The oscillator 3 (Fig. 3) of these demodulators will be set respectively to the same frequencies as the oscillators in the corresponding modulating circuits 15, 16 and 17.

It will be evident that any number of additional modulating circuits, demodulating circuits and separating filters (not shown) may be connected in like manner to the circuit 14 in order to provide a corresponding additional number of pairs of communication channels.

It will be noted that according to conventional methods of transmitting six communication channels, it would be necessary to use six separating filters at each end. The use of the modulating and demodulating circuits according to the invention accordingly enables the number of filters and the number of carrier sources to be halved, thereby effecting an important economy.

Practically no circuit details of the elements shown in Figs. 2 and 3 are given, since all these elements are conventional. The parallel connections shown at various points in Fig. 2 may be made in any convenient way by means of which the necessary phase and amplitude relations are obtained. For example, balanced hybrid coil circuits (not shown) arranged in well known manner can be inserted at the junction points at the inputs and outputs of the phase shifters 5 and 6, at the output of the oscillator 3 and at the outputs of the modulators 1 and 2, though simple parallel or series connections are also possible. It is however of particular advantage to use hybrid coil circuits at the outputs of the phase shifters 5 and 6, since they can easily be arranged to prevent the input waves supplied to conductor 7 from being also supplied to conductor 8, and vice-versa.

It will be understood also that appropriate attenuating networks or amplifiers (not shown) may be inserted where necessary to obtain the proper levels at the points where cancellation of sidebands is to occur.

It will also be understood that the frequency spacings shown in Figs. 1 and 4 are not essential, and other values could be used. For example, the space allotted to a channel in Figs. 1 and 4 need not be 4 kilocycles per second; and in Fig. 1 the width of the vacant space provided between two channel sidebands need not be equal to the width of the space allotted to a channel.

While the principles of the invention have been described above in connection with specific embodiments, and particular modifications thereof, it is to be clearly understood that this description is made only by way of example and not as a limitation on the scope of the invention.

What we claim is:

1. A single sideband modulating circuit for an electric carrier current communication system comprising: two similar amplitude modulators; means for supplying a carrier wave of a given frequency to the two modulators with respective phases differing by 90°; input terminals for each of two signal waves having common frequencies within a given frequency band; a circuit means connecting each input terminal to both modulators, each circuit means consisting of two paths, one path leading from one input terminal to one modulator, the other path leading from the same input terminal to the other modulator and means for introducing into one of said paths at all frequencies in the given frequency band a phase shift which differs by 90° with respect to the phase shift in the other of said paths, the phase-shift differences being of opposite sign for the two signal waves; and means for connecting the outputs of both modulators to a single output circuit in such manner that the upper sidebands produced by the said modulators in response to one signal wave substantially cancel out in the output circuit, and that the lower sidebands produced by the said modulators in response to the other signal wave also substantially cancel out in the output circuit.

2. A carrier current communication system including a transmitter comprising a single sideband modulating circuit according to claim 1 and a receiver comprising a single sideband demodulating circuit; the demodulating circuit including two similar amplitude modulators, means for supplying carrier waves of the given frequency to one of said modulators, means for supplying carrier waves of the same given frequency but differing in phase by 90° to the other modulator, means for supplying the received sidebands to both modulators, a center-tapped output coil, means connecting the terminals of said coil to the outputs of the two modulators through circuits introducing phase-shifts differing by 90°, a first output circuit effectively connected across the output coil and a second output circuit connected to the center-tap of the output coil.

3. A transmitting terminal for a multi-channel carrier current communication system comprising a first single sideband modulating circuit in accordance with claim 1 wherein one of said two signal waves is a complex wave and the other comprises a single frequency auxiliary wave; in combination with a second single sideband modulating circuit also in accordance with claim 1 and also wherein one of said two signal waves is a complex wave similar to said first mentioned complex wave and the other comprises a single frequency auxiliary wave; means for displacing the frequency of the carrier wave of said second modulating circuit from the frequency of the carrier wave of said first modulating circuit, the amount of said displacement being substantially equal to the frequency range of a single sideband of said complex wave whereby the sidebands of those signal waves comprising said auxiliary waves fall within the frequency band between said first and second carrier waves.

References Cited in the file of this patent

UNITED STATES PATENTS

| | | |
|---|---|---|
| 1,504,535 | Affel | Aug. 12, 1924 |
| 2,009,438 | Dudley | July 30, 1935 |
| 2,151,464 | Curtis | Mar. 21, 1939 |
| 2,173,145 | Wirkler | Sept. 19, 1939 |
| 2,248,250 | Peterson | July 8, 1941 |
| 2,431,569 | Dome | Sept. 4, 1951 |
| 2,802,208 | Hobbs | Aug. 6, 1957 |